Aug. 5, 1969   N. C. HEBERT   3,459,641
METHOD OF MEASURING POTASSIUM ION AND GLASS ELECTRODE THEREFOR
Filed Feb. 21, 1967   3 Sheets-Sheet 1

INVENTOR.
NORMAND C. HEBERT
BY *Gerhard K. Adem*
ATTORNEY

United States Patent Office 3,459,641
Patented Aug. 5, 1969

3,459,641
METHOD OF MEASURING POTASSIUM ION AND GLASS ELECTRODE THEREFOR
Normand C. Hebert, Corning, N.Y., assignor to Corning Glass Works, Corning, N.Y., a corporation of New York
Filed Feb. 21, 1967, Ser. No. 617,615
Int. Cl. B01k 3/00
U.S. Cl. 204—1                                        7 Claims

ABSTRACT OF THE DISCLOSURE

Glass electrode for and process of selectively measuring potassium ion activity in the presence of sodium ions wherein the sensing portion is a vanadium pentoxide modified sodium aluminosilicate glass.

---

Figure 1:
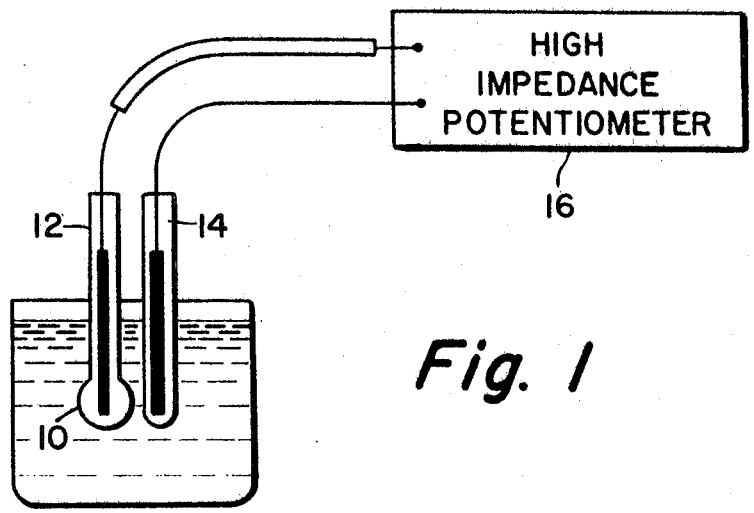

This invention relates to glass electrodes for selectively measuring potassium ion activity in the presence of sodium ions and other cations over a wide range of pH.

Heretofore, in U.S. Patent 2,829,090 issued to Eisenman et al., it has been disclosed that alkali oxide silica glass electrodes containing more than a fraction of a mole percent of alumina are markedly cation sensitive and that electrodes made of sodium aluminosilicates, wherein the ratio of the mole percent of alumina to soda is at least substantially 1 to 1, are of practical utility in selectively measuring sodium ion activity in the presence of potassium ions, hydrogen ions and other cations.

The Eisenman patent also discloses that certain sodium aluminosilicates in which the mole percent of soda is equal to or greater than twice the sum of the mole percent of alumina and 6.25 mole percent are more sensitive to potassium ions than sodium ions. Accordingly, potassium sensing electrodes in which the active portion is made from a glass composition containing about 27 mole percent sodium oxide, 4 mole percent aluminum oxide and the remainder silica have been available commercially. These electrodes have selectivities for sodium ions over potassium ions in the order of up to about 10 to 1.

Unfortunately, the commercially available electrode prior to prolonged aging exhibits an appreciable pH response in neutral to alkaline solutions in addition to the usual pH response obtained in acid solutions. Thus, the pH response in alkaline solutions limit the practical use of the electrode to a pH range of about 3 to 7. This electrode may be employed for potassium ion determinations only over this range and a rigid control of the pH must be maintained to prevent the solution from becoming alkaline. Response to pH disappears very slowly upon aging the electrode in aqueous media and it may take several months of aging before the effect disappears almost completely.

In accordance with the present invention I have discovered an improved glass electrode for selectively measuring potassium ion activity in ionic mixtures including potassium, sodium, and hydrogen ions wherein the active portion of the electrode is made from a glass composition consisting essentially of a sodium aluminosilicate glass containing 1 to 6 mole percent of vanadium pentoxide and wherein the mole percent of soda is equal to or greater than twice the sum of the mole percent of alumina and 6.25 mole percent. The improved electrode exhibits optimum potassium ion to sodium ion selectivity after a very short aging period and has essentially no pH response in alkaline solution and in addition has improved chemical durability and better lampworkability. For purposes of definition the term selectivity as used herein means the ability of the electrode to preferentially measure the activity of a particular monovalent cation in the presence of other monovalent cations.

This invention will be more clearly understood from the following description taken in conjunction with the accompanying drawing in which:

FIGURE 1 is a diagrammatic representation which illustrates conventional equipment for measuring cation concentration or activity.

Figure 2:
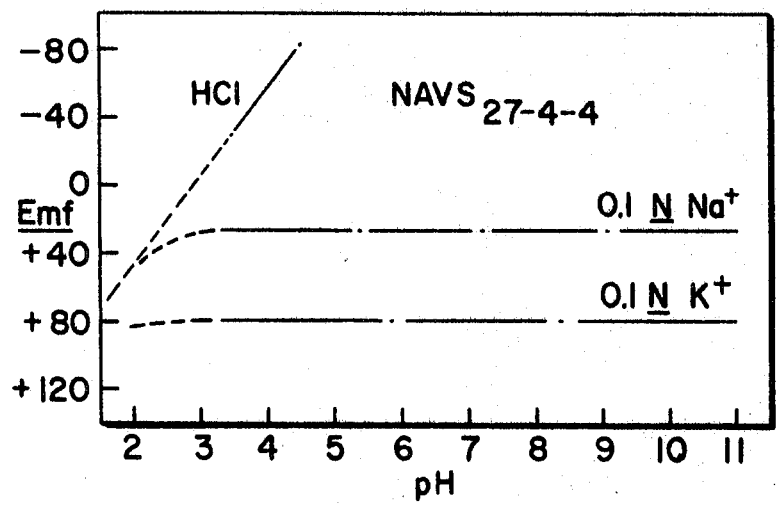

FIGURE 2 graphically shows the K+ selectivity of an electrode considered to be the preferred embodiment of the present invention in which the membrane is formed from $NAVS_{27-4-4}$.

Figure 3:
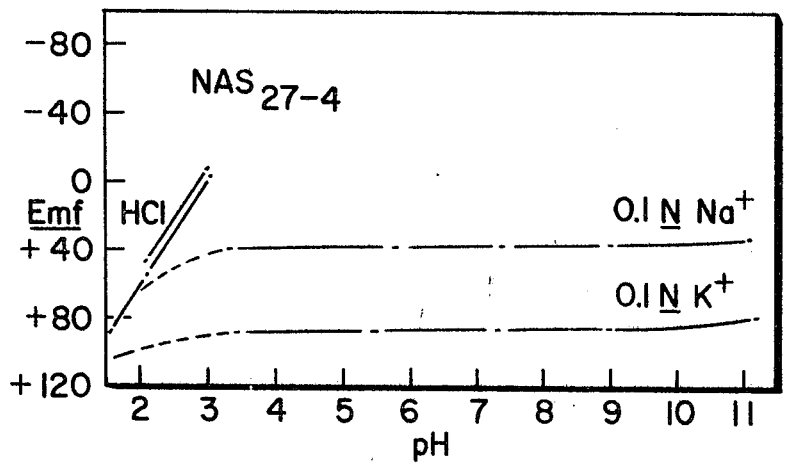

FIGURE 3 graphically shows the K+ selectivity of a commercially available glass electrode formed from $NAS_{27-4}$.

Figure 4:
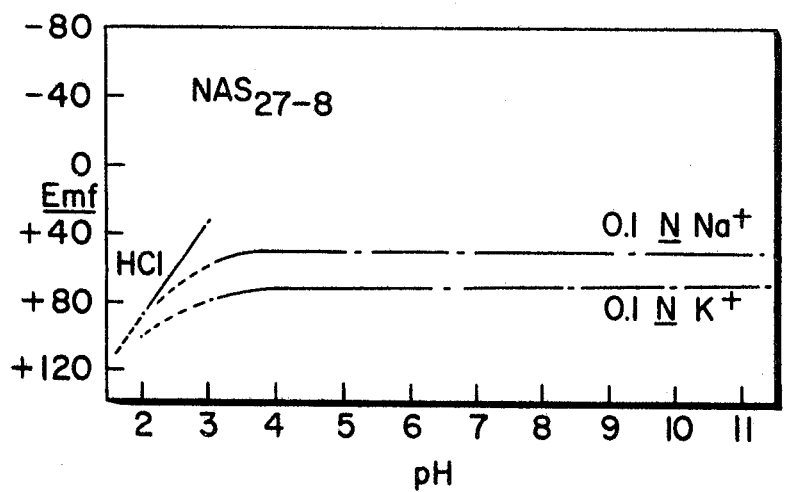

FIGURE 4 graphically shows the K+ selectivity of an electrode in which the membrane portion is formed from $NAS_{27-8}$.

Figure 5:
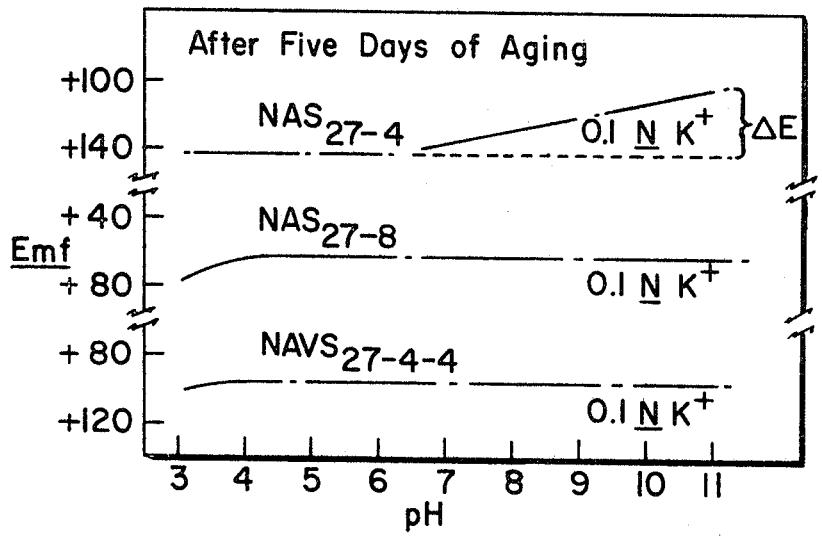

FIGURE 5 represents a comparison of the electrodes shown in FIGURES 2-4 for the property of aging by plotting response to 0.1 N K+ solution as a function of pH.

Referring now to FIGURE 1 conventional equipment is illustrated for measuring cation concentration or activity and employing one embodiment of an otherwise conventional glass electrode 12 with an active portion, bulb or membrane 10 made of a glass composition according to this invention. The glass electrode 12 is operatively connected to a standard half-cell 14, such as saturated KCl-calomel, via conventional high impedance, high gain electrometric amplification equipment 16.

The instrument may be calibrated with known solutions containing mixtures of H+, Na+ and/or K+ as is well known in the art, and then the K+ concentration of unknown solutions can be determined directly by subjecting the respective glass and reference electrodes to the unknown solutions according to the usual procedure. For example, one can employ the following known equation for mixtures having a wide range of pH (e.g. approximately 3 to 11):

$$E = E° + \frac{RT}{F} \ln [(Na^+) + K_{NaK}(K^+)]$$

wherein:

E = measured E.M.F.
E° = standard potential
R = ideal gas equation constant
T = absolute temperature
F = Faraday constant
(Na+) and (K+) = activity or concentration of the ionic species Na+ and K+, respectively
$K_{NaK}$ = empirical constant for a given glass composition and ionic pair Na+ and K+; when >1, it represents selectivity factor for K+ in preference to Na+ on a mole for mole basis.

At an appropriate pH, the equipment is used to measure on potentiometer 16 the potentials of a 0.1 N solution of Na+ and a 0.1 N solution of K+ using a glass electrode of this invention. Employing the above equation, the values of E° and $K_{NaK}$ can be calculated. Next, the same equipment is used to measure the potential of an unknown solution. Then, employing the above equation again, one can insert the value of (Na+), when known or measured by other known means (e.g. flame photometer or glass electrode selective for the Na+), and solve for (K+). For extreme precision, one can solve simultaneously the equations for the potentials of the unknown mixture, measured on the one hand with a K+ selective electrode of this invention and on the other hand with a Na+ selective electrode known in the art, using the values of E° and $K_{NaK}$ for each of these electrodes in the respective equation.

The unique feature of the present invention is directed to the active portion of membrane of the glass electrode. This active portion is made from a composition consisting essentially of 20 to 27 mole percent of soda, 1 to 6 mole percent of alumina, 1 to 6 mole percent of vanadium pentoxide and the remainder about 61 to 77 mole percent of silica.

In order for the sensing portion to be $K^+$ selective, the mole percent of soda should be equal to or greater than twice the sum of the mole percent of alumina plus 6.25 mole percent. Generally, the $V_2O_5$ has little or no effect on the selectivity. It is preferred that the mole percent of $V_2O_5$ be equal to or greater than the mole percent of $Al_2O_3$ in order to obtain the improved electrode of the invention.

Conventional techniques are employed in melting the glass and forming it into a membrane for the glass electrode.

My invention is further illustrated by the following examples.

EXAMPLE I

A glass composition was prepared and melted from the following preferred formulation:

| Oxide | Weight percent | Mole percent | Batch Materials | Weight gm |
|---|---|---|---|---|
| $Na_2O$ | 25.9 | 27.0 | Sodium Carbonate (Reagent Grade). | 560.1 |
| $Al_2O_3$ | 6.3 | 4.0 | Calcined Alumina | 79.8 |
| $V_2O_5$ | 5.6 | 4.0 | Vanadium Pentoxide (C.P. Grade). | 71.1 |
| $SiO_2$ | 62.2 | 65.0 | Pennsylvania Pulverized Sand. | 788.1 |

The batch materials were weighed, then mixed by ball milling. The batch was melted in a platinum crucible at a furnace temperature of 1400° C. for a period of five hours. Thereafter the molten glass was poured into patties and annealed at 425° C.

EXAMPLE II

Another glass composition was prepared and melted from the following formulation:

| Oxide | Weight percent | Mole percent | Batch Materials | Weight gm |
|---|---|---|---|---|
| $Na_2O$ | 26.9 | 27.0 | Sodium Carbonate (Reagent Grade). | 578.6 |
| $Al_2O_3$ | 6.5 | 4.0 | Calcined Alumina | 82.3 |
| $SiO_2$ | 66.6 | 69.0 | Pennsylvania Pulverized Sand. | 838.9 |

The batch materials were weighed, then mixed by ball milling. The batch was melted in a platinum crucible at a furnace temperature of 1375° C. for a period of 16 hours. Thereafter the molten glass was hand-drawn into tubing which was subsequently machine drawn. Also patties of this glass were annealed at 500° C.

EXAMPLE III

A glass composition was prepared and melted from the following formulation:

| Oxide | Weight percent | Mole percent | Batch Materials | Weight, gm. |
|---|---|---|---|---|
| $Na_2O$ | 26.2 | 27.0 | Sodium Carbonate (Reagent Grade). | 186.9 |
| $Al_2O_3$ | 12.7 | 8.0 | Calcined Alumina | 53.6 |
| $SiO_2$ | 61.1 | 65.0 | Pennsylvania Pulverized Sand. | 256.5 |

The batch materials were weighed, then mixed by ball milling. The batch was melted in a platinum crucible at a furnace temperature of 1500° C. for a period of 5 hours. Thereafter the molten glass was poured into patties and annealed at 550° C.

The properties of each of these glass products were determined using conventional methods. These properties are tabulated below:

| | $NAS_{27-8}$ | $NAS_{27-4}$ | $NAVS_{27-4-4}$ |
|---|---|---|---|
| Softening Point, ° C | 682 | 647 | 609 |
| Annealing Point, ° C | 503 | 481 | 455 |
| Strain Point, ° C | 465 | 446 | 425 |
| Thermal Expansion Coefficient (0–300° C.) ($\times 10^{-7}$/° C.) | 118.7 | 123.6 | 125.9 |
| Density, gm./cm.³ | 2.479 | 2.463 | 2.477 |
| Log $\rho$ (25° C.)* | | 9.00 | 9.19 |
| Chemical Durability** | 0.384 | 1.79 | 0.528 |

*I.e., log D.C. volume resistivity (ohm-cm.) at 25° C.
**Reported as percent alkali (in terms of $Na_2O$) leached from 0.4 cm. of glass (40–50 mesh) at 90° C. in four hours.

Electrodes fabricated from the glasses of Example I, Example II, and Example III were individually prepared by blowing a thin bulb (ca. 0.1 mm. wall thickness and 10 mm. diameter) on the end of a glass tube. The bulb was filled with an internal reference solution of 0.1 N NaCl. The stem of the electrode was filled with silicone oil. A chlorided silver wire was placed into the 0.1 N NaCl solution as the internal reference electrode. This electrode and a standard calomel electrode with KCl bridge constituted the cell. The results obtained using electrodes having sensing portions formed from these three glasses are graphically represented by FIGURES 2–5.

FIGURE 3 illustrates the response of a well aged electrode, $NAS_{27-4}$ glass composition, to 0.1 N $Na^+$ and 0.1 N $K^+$ solutions as a function of pH. The $K^+$ selectivity ($K_{NaK}$) of the electrode is 6.8 as calculated from the electrode equation set forth hereinabove. The modification of this electrode glass composition with 4 mol percent $V_2O_5$ does not appreciably alter the selectivity ($K_{NaK}$) of the electrode. FIGURE 2 illustrates the electrode response of a $NAVS_{27-4-4}$ electrode glass composition to 0.1 N $Na^+$ and 0.1 N $K^+$ solutions as a function of pH. The selectivity as calculated from the given electrode equation is $K_{NaK}=7.5$.

On the other hand the addition of 4 mol percent $Al_2O_3$ to the $NAS_{27-4}$ glass electrode composition did reduce the selectivity appreciably A selectivity constant ($K_{NaK}=2.2$) was calculated for an electrode of $NAS_{27-8}$ composition from the data given in FIGURE 4.

The comparative aging characteristics of the sensing glasses are shown in FIGURE 4 which illustrates the electrodes response to 0.1 N $K^+$ solutions as a function of pH. The three electrodes examined had been aged in an aqueous solution for five days. It was noted that the electrode having a bulb composition $NAS_{27-4}$ shows an appreciable pH response or error in the range of pH 7–11 as indicated by the deviation at pH 11 ($\Delta E$) from the normal horizontal line; whereas the electrode having the $V_2O_5$ modified composition ($NAVS_{27-4-4}$) exhibits no pH response over this range. In terms of pH response, the $NAVS_{27-4-4}$ glass electrode behaves similarly to the $NAS_{27-8}$ which has a much lower $K^+$ selectivity ($K_{NaK}$).

Thus it may be concluded from the response characteristics shown in FIGURES 2–5 that:

(1) Selectivity.—The vanadium pentoxide modified sensing glass membrane does not appear to affect the selectivity of the electrode, i.e. the $NAVS_{27-4-4}$ behaves similarly to the $NAS_{27-4}$ and is far superior to the $NAS_{27-8}$.

(2) Aging.—The vanadium pentoxide modified sensing glass substantially improved the aging characteristics of the electrode, i.e., the $NAVS_{27-4-4}$ behaves in alkaline solutions similarly to the $NAS_{27-8}$ and is far superior to the $NAS_{27-4}$.

It will be appreciated that the invention is not limited to the specific details shown in the examples and illustrations, and that various changes or modifications may be made within the ordinary skill of the art without departing from the spirit and scope of the invention.

I claim:

1. An improved glass electrode for selectively measuring potassium ion activity in ionic mixtures including potassium, sodium, and hydrogen ions, said electrode having an active portion made of a composition consisting essentially of a sodium aluminosilicate glass containing 1–6 mole percent of vanadium pentoxide, wherein the mole percent of soda is equal to or greater than twice the sum of the mole percent of alumina plus 6.25 mole percent.

2. The electrode of claim 1, wherein said sodium aluminosilicate glass consists essentially of 20–27 mole percent of soda, 1–6 mole percent of alumina and 61–77 mole percent of silica.

3. The electrode of claim 2, wherein the mole percent of vanadium pentoxide is equal to or greater than the mole percent of alumina.

4. The electrode of claim 3, wherein said composition consists of 27 mole percent of soda, 4 mole percent of alumina, 4 mole percent of vanadium pentoxide, and 65 mole percent of silica.

5. In a process for selectivity measuring potassium ion activity in ionic mixtures including potassium, sodium and hydrogen ions, which process includes the steps of providing a glass electrode with an active portion that is selectively sensitive to potassium ions in the presence of other cations, subjecting the mixture to said electrode and to a standard reference half-cell, and operatively connecting the glass electrode and the reference half-cell to a high impedance electrometric amplifier, the improvement comprising making said active portion from a composition consisting essentially of a sodium aluminosilicate glass containing 1–6 mole percent of vanadium pentoxide, wherein the mole percent of soda is equal to or greater than twice the mole percent of alumina plus 6.25 mole percent.

6. The process of claim 5, wherein said sodium aluminosilicate glass consists essentially of 20–27 mole percent of soda, 1–6 mole percent of alumina and 61–77 mole percent of silica.

7. The process of claim 6, wherein said composition consists essentially of 27 mole percent of soda, 4 mole percent of alumina, 4 mole percent of vanadium pentoxide and 65 mole percent of silica.

References Cited

UNITED STATES PATENTS

| | | | |
|---|---|---|---|
| 2,444,845 | 7/1945 | Perley | 204—195 |
| 2,829,090 | 4/1958 | Eisenman et al. | 204—1 |
| 3,041,252 | 6/1962 | Eisenman et al. | 204—1 |
| 3,356,595 | 12/1967 | Eisenman et al. | 204—1 |
| 3,356,596 | 12/1967 | Eisenman et al. | 204—1 |

JOHN H. MACK, Primary Examiner

G. L. KAPLAN, Assistant Examiner

U.S. Cl. X.R.

106—52; 204—195